E. M. GREEN.
RAKE.
APPLICATION FILED DEC. 14, 1914.

1,194,995.

Patented Aug. 15, 1916.

Witnesses

Inventor
Ella M. Green
By Richard Owen
Attorney

UNITED STATES PATENT OFFICE.

ELLA M. GREEN, OF PAMPA, TEXAS.

RAKE.

1,194,995.   Specification of Letters Patent.   Patented Aug. 15, 1916.

Application filed December 14, 1914. Serial No. 877,208.

*To all whom it may concern:*

Be it known that I, ELLA M. GREEN, a married lady, citizen of the United States, residing at Pampa, in the county of Gray and State of Texas, have invented certain new and useful Improvements in Rakes, of which the following is a specification.

My invention relates to new and useful improvements in rakes.

The primary object of the invention is the construction of a rake of such a shape that all teeth will engage the ground while in use.

A further object of the invention is the construction of a rake of such a shape as to hold the raked material between the ends of the rake and prevent the same from being thrown to either side.

Figure 1:
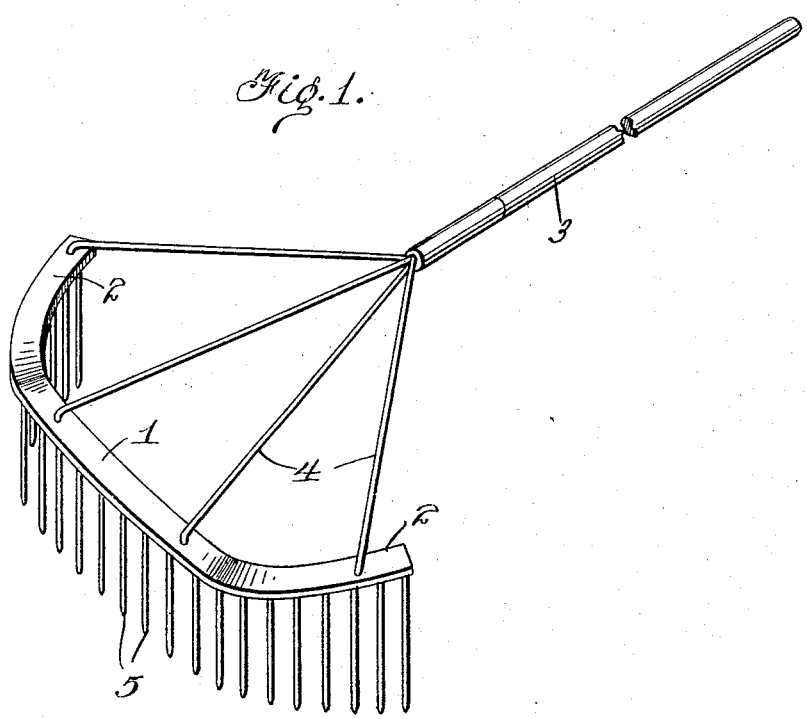
Figure 2:
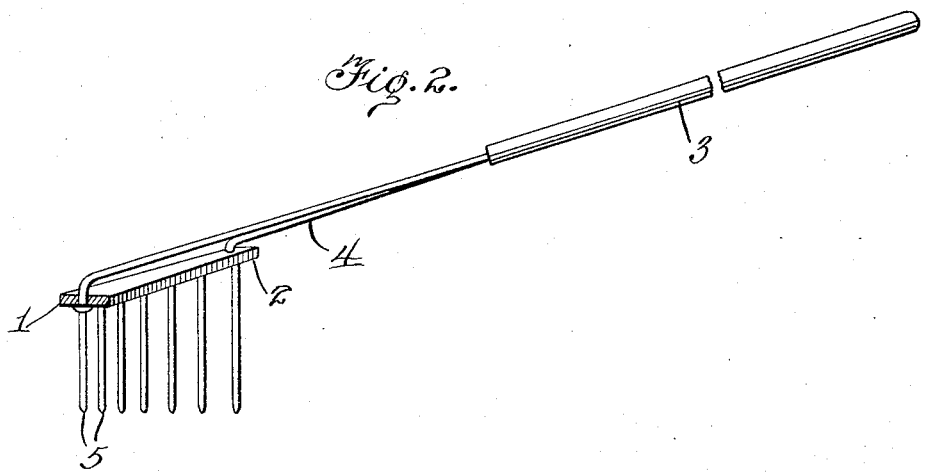

With these and other objects in view the invention consists in the novel details of construction and arrangement of parts which will be more clearly understood from the following description and drawings, in which:

Figure 1 is a perspective view, and Fig. 2 is a transverse section through the rake.

In the drawings, the numeral 1 indicates a bar which is curved laterally and rearwardly at each end and bent, from a point at which the rearward curve begins, upwardly to a point of greater height than the plane of the straight portion of the bar 1 to form the extensions 2. A handle 3 is secured to the bar 1 by a plurality of rods 4 which enter the top of the bar. These rods slant upwardly from the bar so as to hold the handle at an angle. A plurality of teeth 5 are secured to the underside of the bar 1, being of equal length and the teeth on the extensions 2 being of increasing length toward the end, the end teeth being the longest. A proportionate variance in the length of the teeth, in proportion to the upward bend of the extensions 2, is thereby provided, whereby the free ends of the teeth will simultaneously engage the ground and, by virtue of the increased length of the end teeth, increase the capacity of the rake. By constructing a rake in this manner, the handle extending at an angle, when the rake is drawn along the ground all teeth will be in contact with the ground and no grass or other material can pass beneath the teeth. By having the ends of the rake bar curved, as is clearly shown and described, the material raked is thrown toward the center of the rake and none is thrown from the sides. This is of particular advantage as in the ordinary form of rake having the straight rake bar, a certain amount of the material being raked will be thrown from the ends of the rake. By having the ends curved, as shown, adds advantages to the rake in that it may be used between rows of plants and it is capable of entering between the plants for removing material therefrom.

Having fully described the invention what I claim as new and desire to secure by Letters Patent is:—

1. A rake comprising a handle, a bar having laterally curved and upwardly bent ends, a plurality of teeth secured to said bar and varying in length in proportion to the upward bend of the ends of said bar.

2. A rake comprising a bar, having a straight portion and rearwardly curved and upwardly bent end extensions, a plurality of teeth equally spaced and secured to said bar, the teeth on the straight portion being of the same length and the teeth of the upwardly bent extensions being proportionately increased in length in proportion to the bend of the extensions.

3. A rake comprising a handle, a bar connected to said handle, having laterally rearwardly curved ends, said ends being also bent upwardly to a height greater than the straight portion of said bar, a plurality of teeth secured to and equally spaced along the under face of said bar and said extensions, said teeth varying in length in proportion to the varying bend of the ends of said bar, the free end of each tooth being in the same plane with the other teeth.

In testimony whereof I affix my signature in presence of two witnesses.

ELLA M. GREEN.

Witnesses:
 DUPRA SWAIN,
 S. C. GARDNER.

Copies of this patent may be obtained for five cents each, by addressing the "Commissioner of Patents, Washington, D. C."